US008644674B2

(12) United States Patent
Anderson et al.

(10) Patent No.: US 8,644,674 B2
(45) Date of Patent: Feb. 4, 2014

(54) CONTROL LAYER INDEXED PLAYBACK

(75) Inventors: Scott P. Anderson, San Francisco, CA (US); Abbas T. Mahyari, Newark, CA (US); Kenan Malik, San Francisco, CA (US); Aidan Patrick Donohoe, San Francisco, CA (US); Gouri Shivani Varambally, San Francisco, CA (US)

(73) Assignee: Limelight Networks, Inc., Tempe, AZ (US)

( * ) Notice: Subject to any disclaimer, the term of this patent is extended or adjusted under 35 U.S.C. 154(b) by 30 days.

(21) Appl. No.: 13/486,716

(22) Filed: Jun. 1, 2012

(65) Prior Publication Data

US 2013/0322847 A1 Dec. 5, 2013

(51) Int. Cl.
*H04N 9/80* (2006.01)
*H04H 20/14* (2008.01)
*H04N 7/10* (2006.01)

(52) U.S. Cl.
USPC ............... 386/240; 386/248; 725/22; 725/32

(58) Field of Classification Search
USPC .................................................. 386/240, 241
See application file for complete search history.

(56) References Cited

U.S. PATENT DOCUMENTS

| | | | |
|---|---|---|---|
| 5,583,561 A | 12/1996 | Baker et al. | |
| 6,671,807 B1 | 12/2003 | Jaisimha et al. | |
| 8,069,414 B2 * | 11/2011 | Hartwig et al. | 715/719 |
| 8,112,774 B2 * | 2/2012 | Olds | 725/36 |
| 8,169,916 B1 * | 5/2012 | Pai et al. | 370/238 |
| 8,478,836 B1 * | 7/2013 | Chang et al. | 709/213 |
| 2008/0098420 A1 * | 4/2008 | Khivesara et al. | 725/32 |
| 2010/0162324 A1 * | 6/2010 | Mehta et al. | 725/61 |
| 2011/0083073 A1 | 4/2011 | Atkins et al. | |
| 2011/0216162 A1 | 9/2011 | Filippini et al. | |
| 2012/0054616 A1 | 3/2012 | Mittal | |
| 2013/0152124 A1 * | 6/2013 | Agarwal et al. | 725/32 |

OTHER PUBLICATIONS

Nguyen, Distributed Video Streaming Over the Internet, Retrieved on Jul. 5, 2012, http://csce.uark.edu/~jgauch/library/Video/Nguyen.2002.pdf, 2002, p. 1-10.

* cited by examiner

*Primary Examiner* — Heather Jones
(74) *Attorney, Agent, or Firm* — Kilpatrick Townsend & Stockton LLP (57) ABSTRACT

A method and system for controlling a playback experience for one or more videos is disclosed. Actions are specified in control documents for the one or more videos. The actions specify start time and duration for each action, optional introductory or confirmation messages or interface controls, optional gestures, and/or intents that are triggered by the actions. The various control documents are compiled into a single control document that includes a link to the one or more videos and the actions various. Multiple parties can control the playback experience with multiple control documents to provide a multi-layered control experience.

19 Claims, 8 Drawing Sheets

CONTROL LAYER INDEXED PLAYBACK

BACKGROUND

This disclosure relates in general to video delivery and, but not by way of limitation, to control of video playback.

Video is available from any number of sites on the Internet or through content aggregators. Playback of the video from any given source is has rigid controls without any flexibility. For example, YouTube™ allows pause/play, fast forward, rewind, social network buttons, volume, a status bar, etc. that remains the same for each video played. A content aggregator, like Hulu™ or Netflix™, similarly have rigid interfaces for a particular interface on the web, a tablet or video player. The rigidity of these interfaces is inflexible making them inconvenient for certain circumstances.

The video playback experience is predefined by the entity providing the videos. There are other parties involved in the playback experience such as the video creators, ad providers, etc. that have no input into the playback experience. All video for a given distribution channel are presented in the same way. The consistency is conventionally seen to be of value to the users who interact with the distribution channel.

Playback experiences are typically different between different technology platforms. Different platforms have different playback experiences and tools to implement the content delivery. This inconsistency across platform can be confusing to end users who may have multiple devices at any given time configures to interact with a given site or aggregator. Fragmentation is difficult to manage.

SUMMARY

In one embodiment, the present disclosure provides methods and systems for controlling a playback experience for one or more videos. Actions are specified in control documents for the one or more videos. The actions specify start time and duration for each action, optional introductory or confirmation messages or interface controls, optional gestures, and/or intents that are triggered by the actions. The various control documents are compiled into a single control document that includes a link to the one or more videos and the actions various. Multiple parties can control the playback experience with multiple control documents to provide a multi-layered control experience.

In another embodiment, a video delivery system for control of video playback with a plurality of control files from a plurality of sources is disclosed. The video delivery system includes a first and second control files, a control profile, and a control compiler. The first control file is from a first source. The first control file is part of the plurality of control files. The first source is part of the plurality of sources. The first control file specifies a plurality of first actions. The second control file is from a second source. The second control file is part of the plurality of control files. The second source is part of the plurality of sources. The second control file specifies a plurality of second actions. The first source and second sources are from different network locations. Each of the plurality of first actions and second actions has a start, a stop time and an intent. The control profile is for a video content object or a group of video content objects. The control compiler uses the control profile to: disambiguate between one of the first actions and one of the second actions that both overlap in time, and produce a control document for the video content object or group of video content objects. The control document specifies actions controlling playback of the content object or group of content objects.

In still another embodiment, a method for control of video playback with a plurality of control files from a plurality of sources is disclosed. A first control file is received from a first source. The first control file is part of the plurality of control files. The first source is part of the plurality of sources. The first control file specifies a plurality of first actions. A second control file is received from a second source. The second control file is part of the plurality of control files. The second source is part of the plurality of sources. The second control file specifies a plurality of second actions. The first source and second sources are from different network locations. Each of the plurality of first actions and second actions has a start, a stop time and an intent. Disambiguation between one of the first actions and one of the second actions that both overlap in time is performed. Control information is produced for the content object or group of content objects, wherein the control information specifies actions controlling playback of the content object or group of content objects.

In yet another embodiment, one or more servers for control of video playback with a plurality of control files from a plurality of sources is disclosed. The one or more servers include one or more processors, and one or more memories coupled with the one or more processors. The one or more processors in operative engagement with the one or more memories to run code that: receives a first control file from a first source, where the first control file is part of the plurality of control files, the first source is part of the plurality of sources, and the first control file specifies a plurality of first actions; receives a second control file from a second source, where the second control file is part of the plurality of control files, the second source is part of the plurality of sources, the second control file specifies a plurality of second actions, the first source and second sources are from different network locations, and each of the plurality of first actions and second actions has a start, a stop time and an intent; disambiguates between one of the first actions and one of the second actions that both overlap in time; and produces a control document for the content object or group of content objects, where the control document specifies actions controlling playback of the content object or group of content objects.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
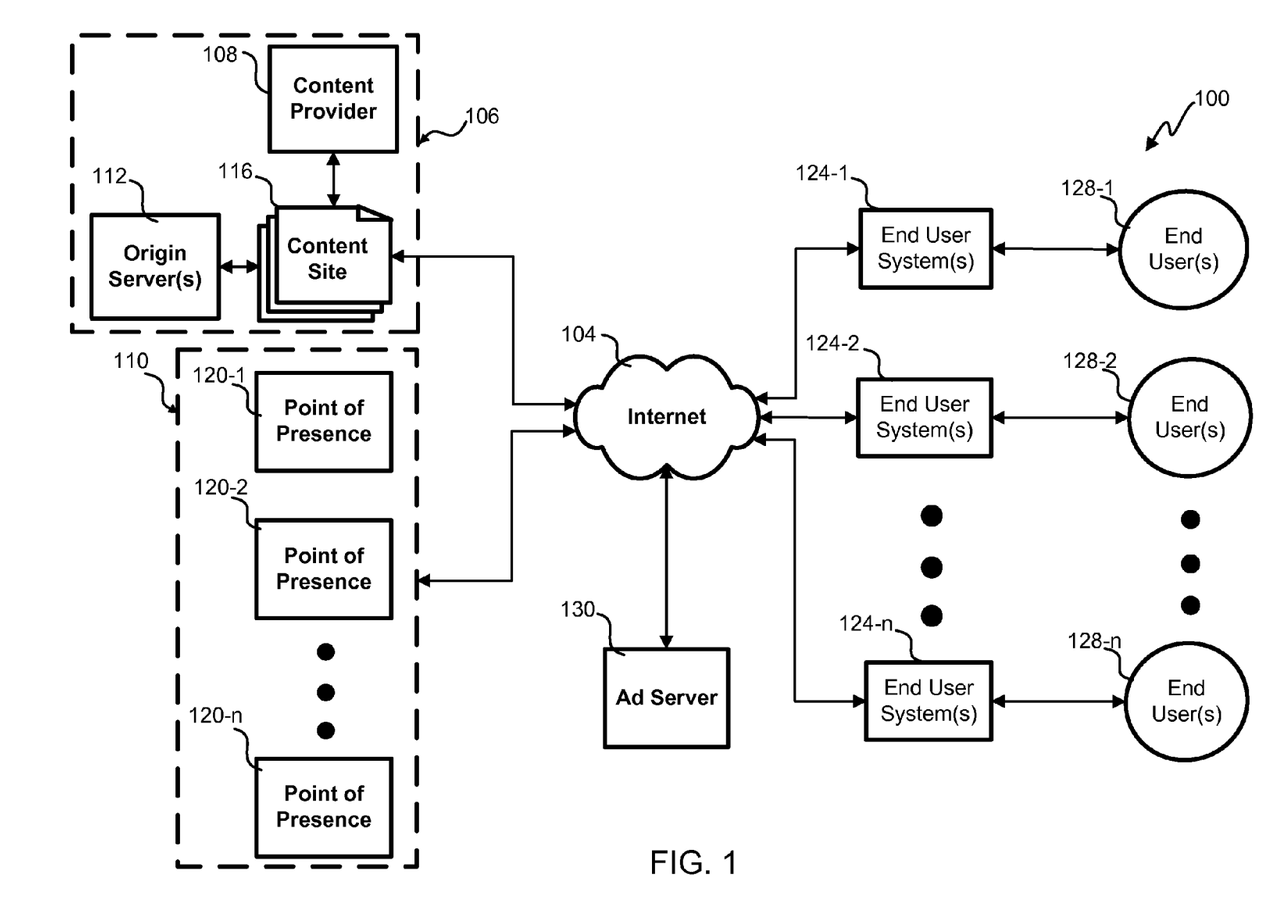
FIG. 1 depicts a block diagram of an embodiment of a content distribution system.

Referring first to FIG. 1, a block diagram of an embodiment of a content distribution system 100 is shown where a content originator 106 offloads delivery of the content objects to a content delivery network (CDN) 110. In this embodiment, the content distribution system 100 can dynamically and efficiently serve content objects (e.g., JavaScript™ applets, images, Hypertext Markup Language (HTML), videos, Flash animations, a control layer, application, etc.) over the Internet 104 to end user systems 124 by an efficient use of caches within the CDN 110. Delivery of a playback experience can be done by the CDN 110 with enhanced quality of service (QoS) by using a number of points of presence (POPs) 120 that is close to the end user system 124, and other techniques.

An end user 128 may request a set of content object, e.g., by requesting a webpage associated with one or more of content objects. For example, a user may request a file, such as a HTML file. The HTML file may include dynamic content that is customized for some or groups of end users 128. A source of each of the content objects and/or the file may be on an edge server, a host server within the CDN, the origin server 112, the content site 116, or on a cache in another POP 120.

A content originator 106 or aggregator produces and/or distributes content objects as the originator of content in a digital form for distribution with the Internet 104. Included in the content originator 106 are a content provider 108, a content site 116 and an origin server 112 in this embodiment. The figure shows a single origin server 112, but it is to be understood embodiments could have multiple origin servers 112 that each can serve streams of the content object redundantly. For example, the content originator 106 could have multiple origin servers 112 and assign any number of them to serve the content object. The origin servers 112 for a given content site 116 could be widely distributed with some even being hosted by the CDN 110.

Although this figure only shows a single content originator 106 and a single CDN 110, there may be many of each in other embodiments. The content object is any content file or content stream and could include, for example, video, pictures, advertisements, applet, data, audio, software, HTTP content, control document, and/or text. The content object could be live, delayed or stored. Throughout the specification, references may be made to a content object, content, and/or content file, but it is to be understood that those terms could be generally used interchangeably wherever they may appear. Some content is dynamic in that different end users 128 get different variations of the content, such that the dynamic content is not easily cached at the edge with the variations being pushed out of the cache before they might be requested again.

Many content providers 108 use the CDN 110 to deliver the content objects over the Internet 104 to end users 128. When a content object is requested by an end user 128, the CDN 110 may retrieve the content object from the content provider 108 for loading in a cache or hosting for a period of time. Alternatively, the content provider 108 may directly provide the content object to the CDN 110 for hosting, i.e., in advance of the first request or in servicing the first request. In this embodiment, the content objects are provided to the CDN 110 through caching and/or pre-population algorithms and stored in one or more servers such that requests may be served from the CDN 110. The origin server 112 holds a copy of each content object for the content originator 106. Periodically, the contents of the origin server 112 may be reconciled with the CDNs 110 through a cache and/or pre-population algorithm. Some embodiments could populate the CDN 110 with content objects without having an accessible origin server such that the CDN serves as the origin server, a host or a mirror. The CDN 110 can store entire content objects or portions of content objects.

The CDN 110 includes a number of POPs 120, which are geographically distributed through the content distribution system 100. Various embodiments may have any number of POPs 120 within the CDN 110 that are generally distributed in various locations around the Internet 104 to be proximate, in a network quality of service (QoS) sense, to end user systems 124. A wide area network (WAN), the Internet 104 and/or other backbone may couple the POPs 120 with each other and also couple the POPs 120 with other parts of the CDN 110. Other embodiments could couple POPs 120 together with the Internet 104 optionally using encrypted tunneling.

When an end user 128 requests a content link or control document link through its respective end user system 124, the request for the content is passed either directly or indirectly via the Internet 104 to the content originator 106. The request for content, for example, could be an HTTP Get command sent to an IP address of the content originator 106 after a look-up that finds the IP address. The content originator 106 is the source or re-distributor of content objects. The content site 116 is accessed through a content web site 116 in this embodiment by the end user system 124. In one embodiment, the content site 116 could be a web site where the content is viewable by a web browser. In other embodiments, the content site 116 could be accessible with application software other than a web browser. The content provider 108 can redirect content requests to any CDN 110 after they are made or can formulate the delivery path beforehand when the web page is formulated to point to the CDN 110. In any event, the request for content is handed over to the CDN 110 for fulfillment in this embodiment after receiving the control document specifying the content.

Once the request for content is passed to the CDN 110, the request is associated with a particular POP 120 within the CDN 110. A routing algorithm used to choose between different POPs 120 could be based upon efficiency, randomness, and/or proximity in Internet-terms, defined by the fabric of the Internet and/or some other mechanism. Other embodiments could find a POP 120 close to the end user system 124 using domain name service (DNS) diversion, redirection, Anycast and/or other techniques. The particular POP 120 then assigns or routes the request to an edge server. The particular POP 120 may retrieve the portion of the content object from the content provider 108. Alternatively, the content provider 108 may directly provide the content object to the CDN 110 and its associated POPs 120, i.e., in advance of the first request. In this embodiment, the content objects are provided to the CDN 110 and stored in one or more CDN servers such that the portion of the requested content may be served from the CDN 110. The origin server 112 holds one copy of each content object for the content originator 106. Periodically, the content of the origin server 112 may be reconciled with the CDN 110 through a cache, hosting and/or pre-population algorithm.

An edge server serving the request to the end user system 124 may access the requested content—either by locally retrieving part or all of the content or requesting it from another server. In some instances, the edge server determines a source for part or all of the requested content within the CDN 110 by querying other peer servers within or remote from the particular POP 120. This embodiment dynamically discovers peer servers, which have already cached or stored the requested content. The peer server that already holds the requested content could be an edge server or a server that doesn't service end user requests, for example, a relay server or ingest server. If part or all of the content cannot be found in the POP 120 originally receiving the request, neighboring POPs 120 could serve as the source in some cases, or the content could be sourced from the content originator 106.

Thus, a request from an end user system 124 for content may result in requests for content from one or more servers in the CDN 110. A CDN server (e.g., an edge server, peer servers, an origin server, etc.) may analyze requested content objects (e.g., requested HTML files), determined versions of the content objects that are cached locally, and transmit to other CDN servers a modified requested for content objects while signaling the versions of the content objects that are cached locally.

The end user system 124 processes the content for the end user 128 upon receipt of the content object. The end user system 124 could be a tablet computer, a personal computer, media player, handheld computer Internet appliance, phone, IPTV set top, streaming radio or any other device that can receive and play content objects. In some embodiments, a number of end user systems 124 can be networked together sharing a single connection to the Internet 104. Changes could be made by the CDN 110 that does not affect the end user realization of the content except to speed delivery.

This embodiment includes an ad server 130. Ad servers 130 sometimes provide banner or video advertisements directly, but more commonly provide a link in response to a request for an advertisement. The link could be to a video itself of a control document that references a video advertisement. The control document specifies the behavior of the video player during playback of the video advertisement. Third parties can move ad inventory through the ad server 130 without knowing exactly which web pages or videos the advertisements will ultimately be placed into.

Figure 2A:
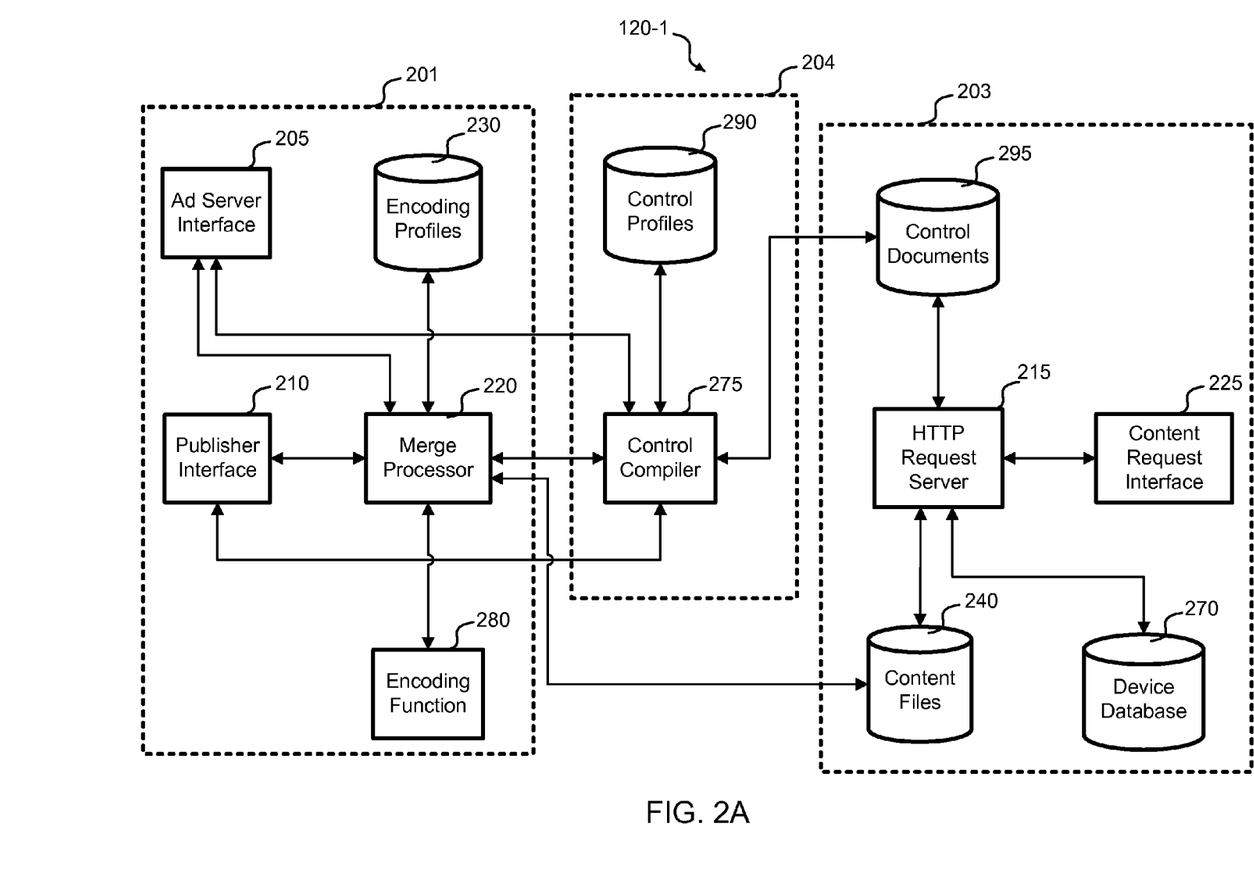
FIGS. 2A and 2B depict block diagrams of embodiments of a point of presence.

With reference to FIG. 2A, a block diagram of an embodiment of a POP 120-1 is shown. The POP 120-1 formulates video content files 240 along with control documents 295 that define the playback experience. Although not shown, the POP 120-1 can deliver player software such as an interface application and control layer that allow a customized playback experience. This embodiment of the POP 120-1 includes a video merge function 201, a control merge function 204 and an edge server 203, but it is to be understood there could be many of each of these in a given POP 120 operating in parallel to efficiently process a given load.

The video merge function 201 inserts advertising into video content files 240 prior to the request for the video content file 240. A merge processor 220 requests the one or more video segments from the origin server 112 through the publisher interface 210. An ad server interface 205 is utilized to query for an advertisement from an ad server 130. The control document and video clip for the advertisement are gathered with the ad server interface 205.

Encoding profiles 230 are used to instruct the merge processor 220 in utilization of an encoding function 280. There may be different video codecs, bitrates, and/or resolutions supported by a given content originator 106 as defined by the encoding profiles 230. The merge processor 220 puts together a content file for each combination specified in the encoding profile 230 for a content object or group of content objects. For example, the encoding profile for a particular content aggregator may specify MPEG4 encoding at 500 KB/sec, 2 MB/sec, or 5 MB/sec data rates such that a single content object with any ads inserted is stored as three different content files 240 available for subsequent request without any delay for encoding.

Control documents are provided from potentially many different sources. A content publisher 106 can have a control document for each content object or group of content objects. Additionally, the studio, production company, actor, producer, copyright owner, content censor, etc. can provide control documents that apply to associated content objects. The control merge function 204 combines or compiles the various control documents while disambiguating potentially conflicting actions and intents. A control profile 290 for each content object or group of content objects specifies a hierarchy between the various control documents that might exist such that control documents higher in the hierarchy win over those lower in the hierarchy. For example, a studio control document might have priority over a content provider control document such that a look-and-feel for the studio would be the one that is part of the user experience. In another example, a content provider 106 may not allow skipping of commercials such that fast forward actions provided in an advertisement may not be allowed. The control compiler 275 resolves all these conflicts to put together a control document for each content object or content file that allows fast forward during the program, but not the commercial breaks.

A control document 295 defines various actions that define the look-and-feel of a playback experience. Each action has a start time and duration to define a window, an optional message, an optional interface control, an optional gesture or other selection mechanism for the action, an optional confirmation indicator or message, and an intent that is triggered to accomplish the action. An intent is an application program interface (API) supported by Android™ and iOS™ devices to signal between software to activate certain functionality. Other platforms are expected to support intent handling.

Referring to the sole Table, various example actions are shown for a given control document 295. The pausing of the video action is available throughout the content file 240. A pause button is displayed by the video player interface. Additionally, a two-finger gesture is recognized by the touch screen to activate the pause action. No confirmation message is displayed before pausing. An intent is formulated by the video player interface and passed to the native video player to pause the playback of the content file 240. In another table entry, fast forwarding action is disabled between 22:15 and 22:45 in the content file playback presumably because it corresponds to an advertisement. No fast forward button or gesture is recognized in that time window.

TABLE

Action Examples for Control Documents

| Action | Window | Control | Gesture | Confirm | Intent |
|---|---|---|---|---|---|
| Pause | All | Button | Two finger | No | Signal video player to pause |
| FF | Not Ads | Button | Drag Right | No | Signal video player to fast forward |
| More Info | Ads | None | Tap | Message | Bring up additional information window |
| Search | Not Ads | None | Diagonal Swipe | Message | Search web with default search engine |
| Tweet | All | Button | None | Message | Send link to Twitter ™ app |
| Next | Last 10% | None | Swipe Left | No | Signal interface to advance to next video |
| FF | 22:15-22:45 | None | None | No | Disable fast forward during ad |
| Chapter Change | All | Button | Three Finger Drag | No | Last/Next Chapter or Index |

An edge server 203 is used to fulfill requests for content files and control documents from each POP 120-1. An HTTP request server 215 in each POP 120 passes control documents 295 and/or content files 240 when requested. The HTTP request server 215 has access to several versions of the same content file, but in different encode rates or formats. A request received through the content request interface 225 is analyzed to determine the end user system 124 performing the request and the correction version of the content file 240 is returned. For example, a feature phone with a small screen will receive a lower bitrate version of the content object than an Android™ phone. Use of the device database 270 allows for choosing a content file most appropriate for the situation from the many content files for a given content object.

Figure 2B:
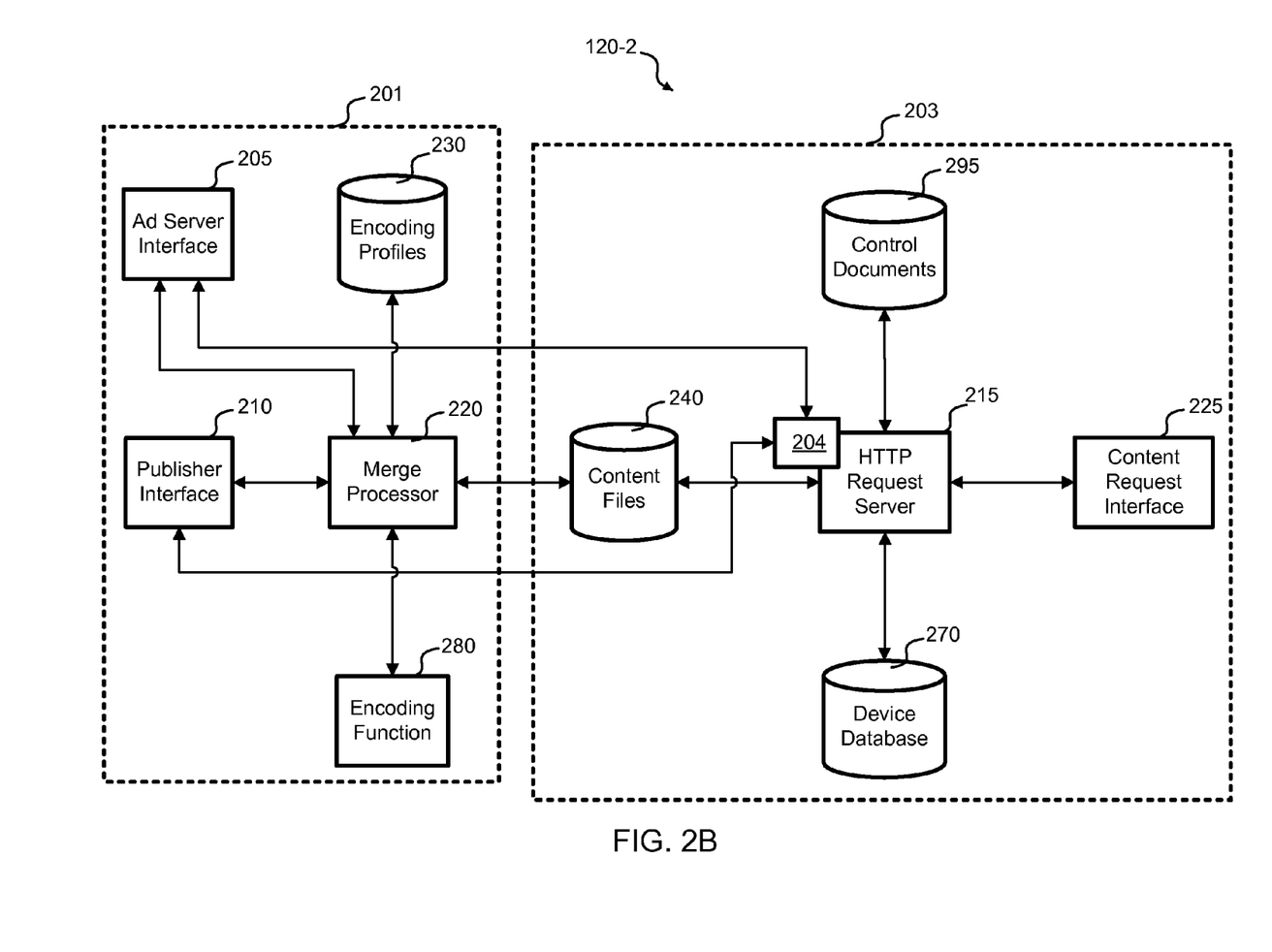

Referring next to FIG. 2B, a block diagram of another embodiment of the POP 120-2 is shown. In this embodiment, the control merge function 204 is built-into the HTTP request server 215 to allow compiling a control document 290 at run-time, which is to say that the control document 290 for a particular content request is formulated after the request is received by the POP 120-2. The ad server interface 205 can be queried for the latest control document for any advertisement inserted into the content file after the request for the content object from the end user. Additionally, the publisher interface 210 could be queried for the latest control document after the request for content. Last-minute updates to the control document could be integrated into the playback experience in this way. For example, a coupon code could be updated for display with a commercial that changes over time or even with each playback of the commercial.

In some embodiments, information about the end user 128, end user system, or particular instance of the content object playback could be passed to the publisher interface 210 and ad server interface 205 after the user requests the content object. In this way, the playback experience could be customized for the end user or a given instance of playback. For example, a user watching a sporting event could be played a commercial that is customized. There could be a message that says, it is almost half-time and include a coupon code to order pizza for delivery from a nearby restaurant. Should the restaurant be too busy, the coupon code could be eliminated or replaced with a less attractive offer. In another example, there might be customization of branding elements for a program to match the local affiliate broadcasting the program. For example, a barker could have local new information or a station identifier bug could be added to the playback. In this way, preformulated encodes of the content object (i.e., content files) could be customized with any of the functionality possible in the control document.

Although not shown, the POP 120 could host the app used for video playback such that it can be downloaded to the end user system 124. There could be different versions of the app for different types of end user systems 124. For example, there could be an iOS™ and an Android™ version that are downloaded in the alternative based upon which class of device is serving as the end user system 124, although the versions for the various platforms could be hosted by a third party in some cases. A control layer may be universally used with the app or even built-in functionality of the end user system. The control layer in conjunction with the app or built-in functionality serve as the video player in this embodiment. A new control layer could be downloaded previously or at run-time. A new control layer downloaded at playback time would allow integrating last minute functionality, branding, etc. to quickly customize the playback experience and/or provide for new functionality called by the control document.

Figure 3:
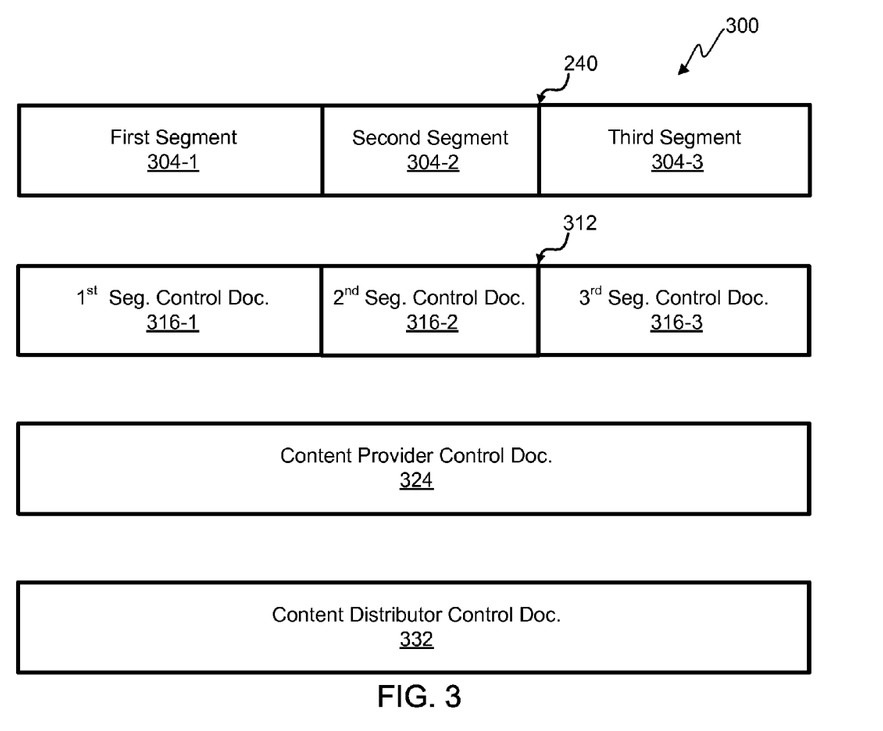
FIG. 3 depicts a block diagram of an embodiment of playback files used to define playback experience.

With reference to FIG. 3, a block diagram of an embodiment of playback source files 300 used to define playback experience is shown. In this embodiment, a content file 240 has been created from three different segments 304. The segments 304 could be cobbled-together as episodes or chapters or could be program segments interlineated with advertisements. The merge processor 220 gathers these segments and weaves them together into a single content file or a number of content files 240 that are ready for playback in real time without delay after request.

Each video segment 304 can have one or more segment control documents 316 associated with it. Where there are multiple segment control documents 316 for a video segment 304, they are compiled together appreciating their limited time duration in the overall content file 240. Noting the applicability window for each segment control document 316 allows alignment with the corresponding video segment 304 so that control is segregated. Additionally, this embodiment includes a content provider control document 324 and a content distributor control document 332. For example, the content provider 108 could be the studio and the content distributor could be the content originator web site. The control profiles 290 would tell the control compiler 275 which control document has priority when resolving ambiguities, inconsistencies and differences between the various control documents 312, 324, 332.

Figure 4:
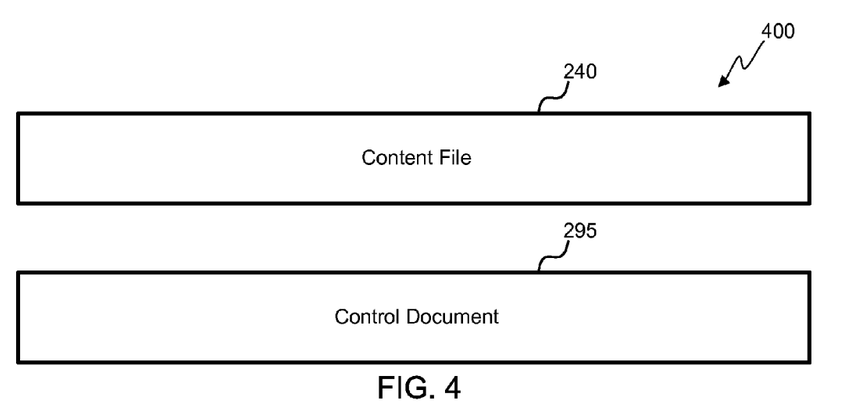
FIG. 4 depicts a block diagram of an embodiment of compiled playback files.

Referring next to FIG. 4, a block diagram of an embodiment of compiled playback files 400 is shown. For a given playback experience, there is a content file 240 encoded and merged together for a particular end user 128, end user system 124 and/or instance of playback. A control document 295 is compiled for the content file 240 or possibly a group of content files 240 corresponding to the content object. For example, a control document 295 may be used for a high bit rate version of a content object as well as a low bit rate version of the same content object such that two content files 240 have the same control document 295. The control document 295 references the content file or content files 240 such that a request for a content object may initially be a request for the control document 295 which the video player then uses to request one of the corresponding content files 240. The video player may decide which content file 240 from the many alternative encodes would provide the desired playback experience in some embodiments rather than having the edge server decide.

Although this embodiment shows one control document 295 for one or more content files 240, other embodiments could have multiple control documents 295 for one or more content files 240. After the request for the control document, the HTTP request server 215 could choose from a number of control documents 295 based on an analysis of the content file 240, end user 128, end user system 124, etc. For example, for a female end user 128 in Dallas, the control document 295 may be different than a control document 295 provided to a requester on a low bandwidth connection in Alaska of unknown gender. In this way, the playback experience can be customized on a request-by-request basis.

Figure 5A:
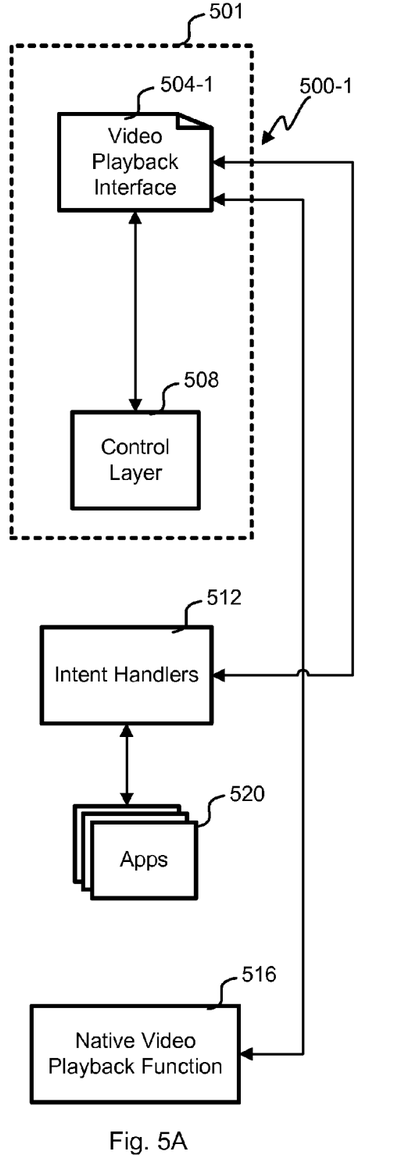
FIGS. 5A and 5B depict block diagrams of embodiments of player software.

With reference to FIG. 5A, a block diagram of an embodiment of player software 500-1 is shown. A player app or application 501 includes a video playback interface 504-1 and a control layer 508. The video playback interface 504-1 is an application that is activated by the end user 128 to play the video file 240. The video playback interface 504-1 calls the web server for the control document 295 and uses information in that control document 295 to request the video file 240. Typically, the video playback interface 504-1 is custom software for a given platform running on the end user system 124.

The control layer 508 provides the functionality that can be called by the control document 295 and the look-and-feel of the video player 500. Implementation of the control layer 508 is done with HTML5, JavaScript™ and cascading style sheet (CSS) files. The control layer 508 is the same for different platforms in this embodiment, for example, is the same on both iOS™ and Android™. The control layer 508 is relatively small in size and could be requested by the video playback interface 504-1 periodically or with each content file 240 requested. In this way, the look-and-feel of the video player 500 could change.

Intents are used by the player app 501 as an API to request functionality from other functions of the software in the end user system 124 or even functionality within the player app 501 itself. Multiple platforms support the same intent APIs to allow the control layer 508 to operate on the different platforms in a universal way. The video playback interface handles intent calls that are used to manipulate the native video player function 516, for example, to allow playing the content file 240 in a window in the screen for the video playback interface 504. Through the intent API in the video playback interface 504-1, the native video playback function 516 can be instructed to play, pause, scan forward or back, jump to a point in the video, for example. Additionally, the native video playback function 516 informs the video playback interface 504-1 where in the playback the content file 240 is currently. Control documents 295 have functionality keyed to playback time such that the control layer 508 receives the playback time to implement the changing functionality. There can be other intent handlers 512 outside the player app 501 that are used as APIs to other apps 520.

The player app 501 also supports intent calls from other third party apps. The two calls currently supported are play a content file 240 or provide a list of content files. Other applications or the control layer 508 can call to these supported intents. Where a call is made for a list of content files, a really simple syndication (RSS) feed is provided with links to multiple content files organized around some theme or other principle. Other embodiments could indicate the list of content files in an XML, JSON or other markup language.

Figure 5B:
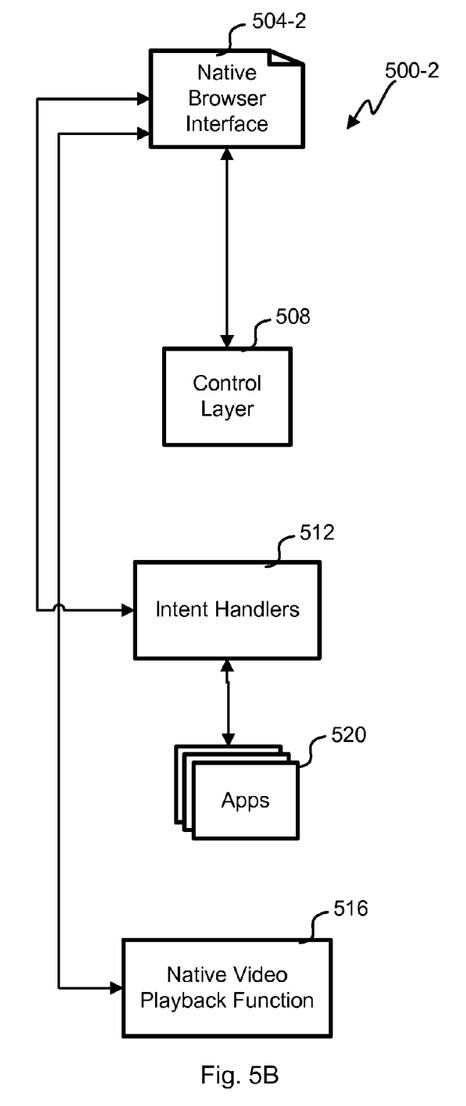

Referring next to FIG. 5B, a block diagram of another embodiment of player software 500-2 is shown. In this embodiment, there is no application software that is downloaded. Instead, the native browser interface 504-2 or a player interface built-into the platform is used. HTML5 is used to instruct the native browser interface 504-2 how to interact with the control layer 508. As mentioned above, the control layer 508 for this embodiment may be used on different platforms with a full-featured native HTML5 support or a video player interface application software component. It is anticipated that as the platforms on end user systems 124 evolve, there will be no need to download application software to enable the player software 500 that supports the control layer 508. Further, some functionality of the control layer 508 could be added to the platform over time to move that functionality into being natively supported.

Figure 6:
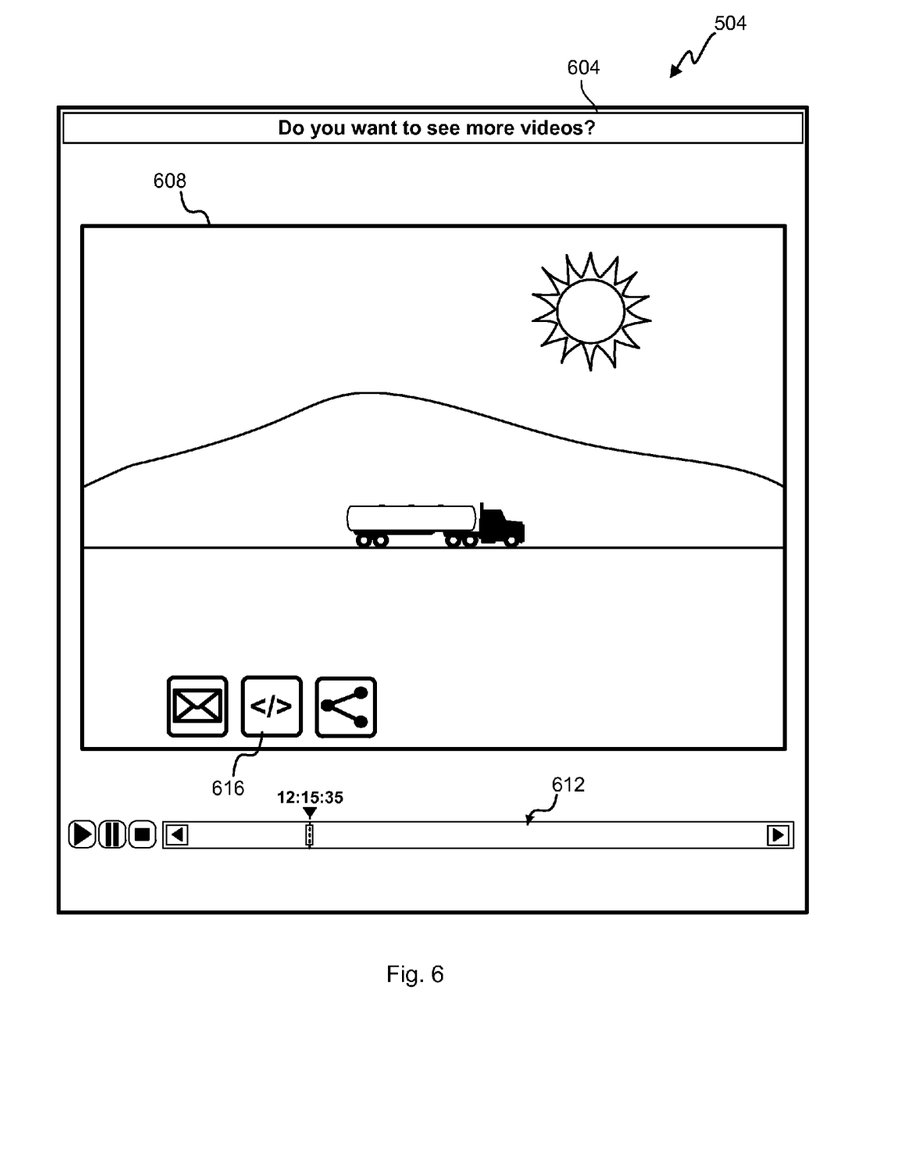
FIG. 6 depicts a block diagram of an embodiment of a video playback interface.

With reference to FIG. 6, a block diagram of an embodiment of a video playback interface 504 is shown. This video playback interface could be a downloaded app function or natively supported on the platform in various embodiments. The control layer allows customization of the look-and-feel along with supporting actions that are called by the control document. A text field 604 is provided for in the control layer that is customized by the control document to ask a question, namely, "Do you want to see more videos?" A gesture or button could allow answering that question so that the video playback interface could activate a list of alternative videos found by calling a RSS feed or referencing a markup file, for example. A button could be provided or is implicit by a tap to the text field 604.

A playback window 608 is filled by an intent call to the native video playback function 516. The video playback function 516 fills the playback window 608 and reports the point in playback. The control layer 508 provides for a playback manipulation control 612 that uses the playback point to move a marker along a scale. Also supported by the control layer 508 are overlay icons, for example a link icon 616. Activation of an icon by a gesture, cursor or key press would activate some functionality. For example, the link icon 616 when activated provides a window with a link to the video and/or point in playback of the video. The link can be copied and embedded in other web pages or sent to an e-mail or other address. The control layer can be customized and/or augmented to implement any action or functionality.

Figure 7:
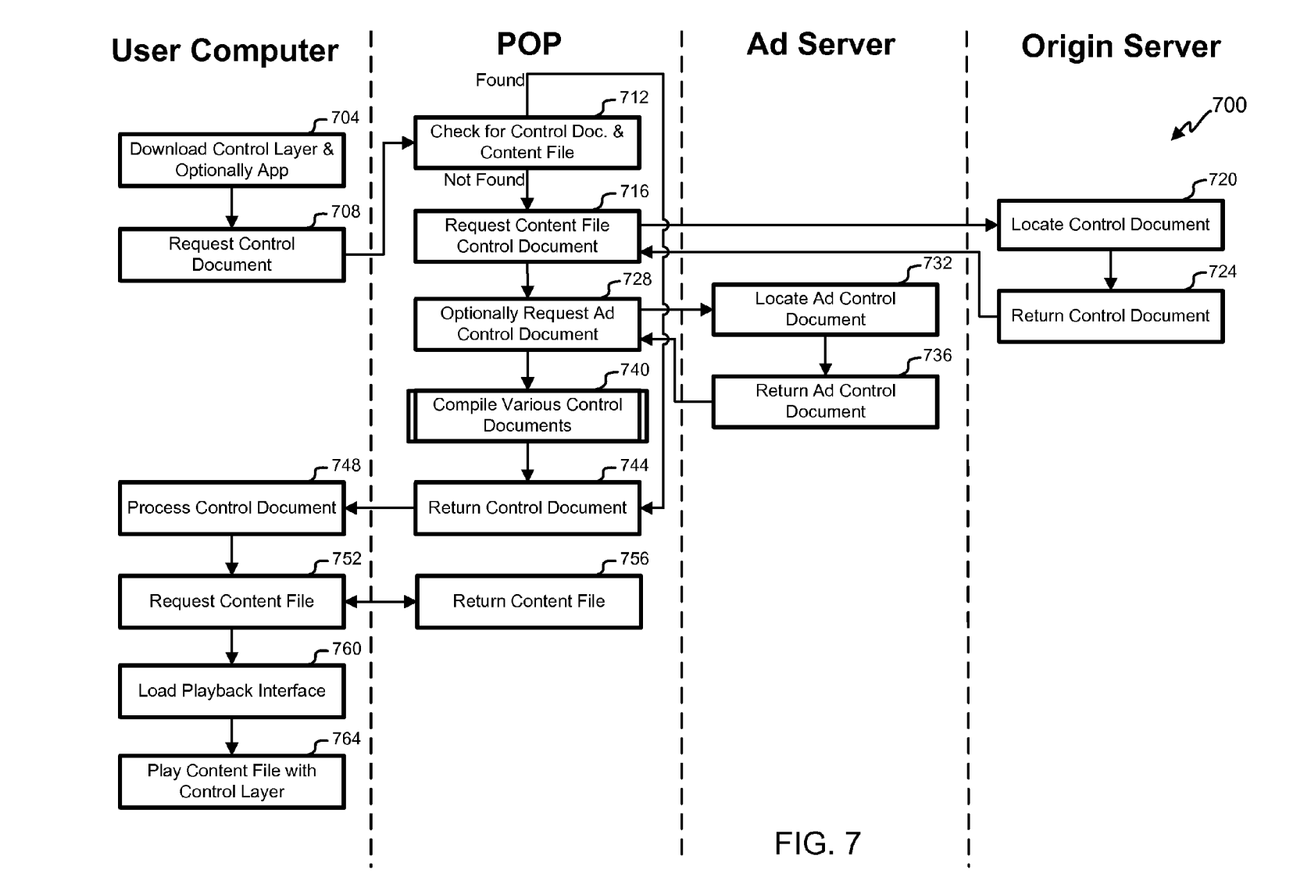
FIG. 7 illustrates a swim diagram of an embodiment of a process for delivering a playback experience.

Referring next to FIG. 7, a swim diagram of an embodiment of a process 700 for delivering a playback experience is shown. The depicted portion of the process begins in block 704 where the control layer 508 and optionally a video playback interface app 504 is downloaded onto the platform of the end user system 124. The end user 128 browses or otherwise discovers a content object or group of content objects to view. The control document 295 is requested in block 708. The HTTP request server 215 at the POP 120 receives the request for the control document 295 and checks for it along with the one or more content files associated with the control document 295.

Where the control document 295 is found in block 712, processing goes to block 744 where the control document 295 is returned to the end user system 124. The control layer 508 begins processing the control 295 and requests the content file 752. The video playback interface app 504 is loaded with the playback window 608 filled with the video file 240 in block 760. The content file 240 is played in block 764 with all the actions indicated by the control document 295. Different control layers 508 and control documents 295 define the playback experience and can be modified to give a completely different look-and-feel along with the branding and colors. Any different look-and-feel can be implemented in this way.

Returning back to block 712 for the case where the control document 295 is not stored on the POP 120 when requested, processing goes from block 712 to 716 where the control document is requested from the origin server 112. Other embodiments could query several locations to gather any number of control documents 295. The origin server 112 locates the control document in block 720 and returns the control document 295 in block 724 back to the POP 120. Where there is an advertising segment(s) or other segments 304, the segment control documents 316 are requested in block 728. The ad server 130 locates in block 732 the segment control document 316 and returns it in block 736. In block 740, the various control documents are compiled by the control compiler 275. At this point, processing goes to block 744 and proceeds as described above in the other conditional.

Figure 8:
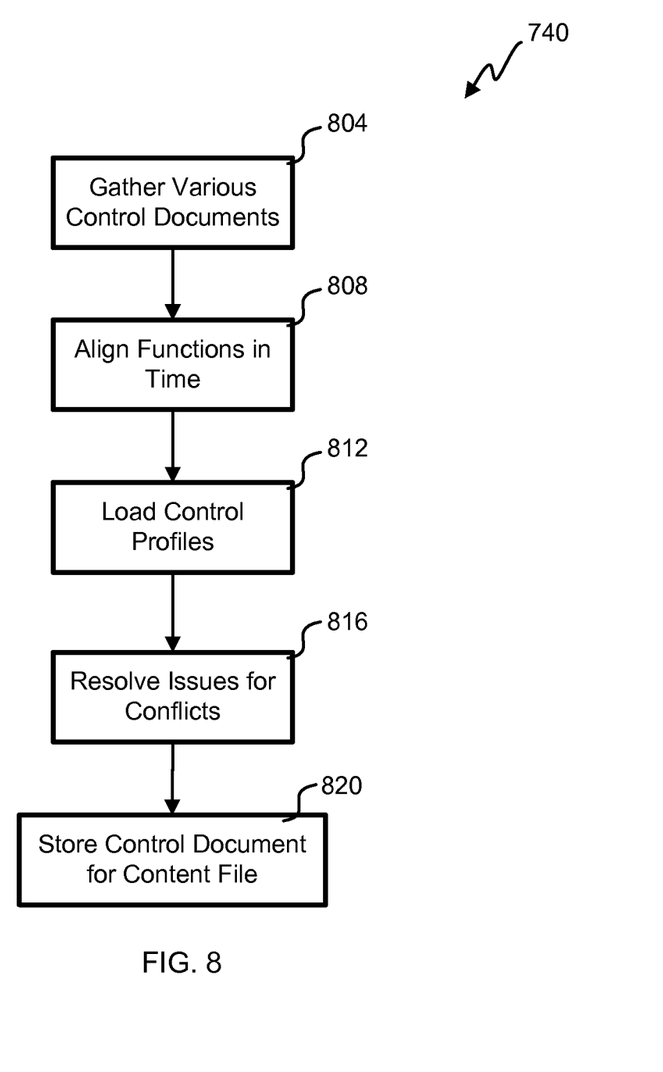
FIG. 8 illustrates a flowchart of an embodiment of a process for compiling various control documents.

With reference to FIG. 8, a flowchart of an embodiment of a subprocess 740 for compiling various control documents is shown. The depicted portion of the process begins in block 804 where the various control documents from different sources and segments have been gathered. Any segments are aligned in time along with the actions from all the control documents in block 808 by the control compiler 275. The control profiles 290 for the parties providing the various control documents and segment control documents are loaded. Hierarchy for conflicts between actions are defined by analysis of the control profiles 290. The conflicts are resolved in block 816. There can be various ways to pick a winner in a conflict or compromise in various embodiments. The actions that survive this process are written into the control document 295 for the content object or group of content objects in block 820.

A number of variations and modifications of the disclosed embodiments can also be used. For example, the above embodiments describe compiling a control document and merging video files together in the cloud, but other embodiments could perform these functions on the end user system. The POP 120 could provide a playlist of video segments or ad servers could be queried for these segments to form a playlist that the player app 501 would use to merge together into a single video playback. Additionally, the player app 501 could gather the various control documents and segment control documents along with the control profiles 290 to decide which actions to take when during playback.

Above embodiments discuss the exchange of files for video and control, but other embodiments need not operated on files. APIs could allow exchanging of commands for example. Also, video could be streamed without creation of a file. Actions would still be communicated along with reference to a window in the playback, but concepts of beginning or end of a video or file need not be communicated.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A video delivery system for control of video playback of an output video content object generated from a plurality of video segments for an end user system, with a plurality of control files from a plurality of sources, the video delivery system comprising:
  a first control file from a first source that is a content provider, wherein:
    the first control file is associated with one of the video segments that corresponds to a requested video content object and is addressable with a first universal resource indicator (URI),
    the first control file is part of the plurality of control files,
    the first source is part of the plurality of sources, and
    the first control file specifies a plurality of first actions that define a look-and-feel of a video player of the end user system;
  a second control file from a second source that is a third party with respect to the content provider, wherein:
    the second control file is associated with one of the video segments that corresponds to an advertising video content object and is addressable with a second URI,
    the second control file is part of the plurality of control files,
    the second source is an ad server, and part of the plurality of sources,
    the second control file specifies a plurality of second actions that define the look-and-feel of the video player of the end user system,
    the first source and second sources are from different network locations, and
    each of the plurality of first actions and second actions is associated with
      a corresponding one of the video segments, a start time, a stop time, and
      an application program interface (API) intent for the corresponding video segment;
  a control profile for the requested video content object or a group of video content objects that provides a hierarchy specifying which of the first and second actions take priority in the event of a conflict among the control files; and
  a control compiler that uses the control profile to:
    disambiguate between the first actions and the second actions where their associated video segments overlap in time within the output video content object, according to the hierarchy specifying which of the first and second actions take priority in the event of a conflict, and
    produce a control document for the output video content object or group of video content objects, wherein the control document
      includes at least the first URI and the second URI that specify where to find the requested video content object and the advertising video content object, and
      specifies actions controlling playback of the content object or group of content objects for all video segments of the output video content object.

2. A video delivery system for control of video playback of an output video content object generated from a plurality of video segments for an end user system, with a plurality of control files from a plurality of sources, the video delivery system comprising:
  a first control file from a first source that is a content provider, wherein:
    the first control file is associated with one of the video segments that corresponds to a requested video content object,
    the first control file is part of the plurality of control files,
    the first source is part of the plurality of sources, and
    the first control file specifies a plurality of first actions that define a look-and-feel of a video player of the end user system;
  a second control file from a second source that is a third party with respect to the content provider, wherein:
    the second control file is associated with one of the video segments that corresponds to a related video content object,
    the second control file is part of the plurality of control files,
    the second source is part of the plurality of sources,
    the second control file specifies a plurality of second actions that define the look-and-feel of the video player of the end user system,
    the first source and second sources are from different network locations, and
    each of the plurality of first actions and second actions is associated with
      a corresponding one of the video segments, a start time, a stop time, and
      an application program interface (API) intent for the corresponding video segment;
  a control profile for the requested video content object or a group of video content objects that provides a hierarchy specifying which of the first and second actions take priority in the event of a conflict among the control files; and
  a control compiler that uses the control profile to:
    disambiguate between the first actions and the second actions where their associated video segments overlap in time within the output video content object, according to the hierarchy specifying which of the first and second actions take priority in the event of a conflict, and
    produce a control document for the output video content object or group of video content objects, wherein the control document specifies actions controlling playback of the content object or group of content objects, for all video segments of the output video content object.

3. The video delivery system for control of video playback with the plurality of control files from the plurality of sources as recited in claim 2, wherein the group of content objects is specified with a URI to a feed or markup file.

4. The video delivery system for control of video playback with the plurality of control files from the plurality of sources as recited in claim 2, wherein:
  the control document specifies an action that optionally triggers an API intent, and
  the intent causes software to perform a function related to the action.

5. The video delivery system for control of video playback with the plurality of control files from the plurality of sources as recited in claim 2, wherein the control compiler is located away from where the video content object or group of video content objects is rendered for playback.

6. One or more servers for control of video playback of an output video content object generated from a plurality of video segments for an end user system, with a plurality of control files from a plurality of sources, the one or more servers comprising:
  one or more processors configured to:
    receive a first control file from a first source that is a content provider, wherein:
      the first control file is associated with one of the video segments that corresponds to a requested video content object, the first control file is part of the plurality of control files,
the first source is part of the plurality of sources, and
the first control file specifies a plurality of first actions that define a look-and-feel of a video player of the end user system;
receive a second control file from a second source that is a third party with respect to the content provider, wherein:
the second control file is associated with one of the video segments that corresponds to a related video content object,
the second control file is part of the plurality of control files,
the second source is part of the plurality of sources,
the second control file specifies a plurality of second actions that define the look-and-feel of the video player of the end user system,
the first source and second sources are from different network locations, and
each of the plurality of first actions and second actions is associated with a corresponding one of the video segments, a start time, a stop time, and an application program interface (API) intent for the corresponding video segment;
disambiguate between one of the first actions and one of the second actions where their associated video segments overlap in time within the output video content object, according to a hierarchy specifying which of the first and second actions take priority in the event of a conflict among the control files; and
produce a control document for the output video content object or group of content objects, wherein the control document:
specifies actions controlling playback of the content object or group of content objects for all video segments of the output video content object; and
one or more memories coupled with the one or more processors.

7. One or more servers for control of video playback with a plurality of control files from a plurality of sources as recited in claim 6, the one or more processors further configured to receive a control profile for the requested video content object or a group of video content objects, that provides the hierarchy specifying which of the first and second actions take priority in the event of a conflict among the control files.

8. One or more servers for control of video playback with a plurality of control files from a plurality of sources as recited in claim 6, the one or more processors further configured to send the control document to the video player of the end user system that renders the content object or group of content objects.

9. One or more servers for control of video playback with a plurality of control files from a plurality of sources as recited in claim 6, wherein the control document specifies a feed or markup file that corresponds to the group of content objects.

10. One or more servers for control of video playback with a plurality of control files from a plurality of sources as recited in claim 6, wherein the control document is produced with a processor that also renders the content object or group of content objects.

11. A method for control of video playback of an output video content object generated from a plurality of video segments for an end user system, with a plurality of control files from a plurality of sources, the method comprising:
receiving a first control file from a first source that is a content provider, wherein:
the first control file is associated with one of the video segments that corresponds to a requested video content object,
the first control file is part of the plurality of control files,
the first source is part of the plurality of sources, and
the first control file specifies a plurality of first actions that define a look-and-feel of a video player of the end user system;
receiving a second control file from a second source that is a third party with respect to the content provider, wherein:
the second control file is associated with one of the video segments that corresponds to a related video content object,
the second control file is part of the plurality of control files,
the second source is part of the plurality of sources,
the second control file specifies a plurality of second actions that define the look-and-feel of the video player of the end user system,
the first source and second sources are from different network locations, and
each of the plurality of first actions and second actions is associated with a corresponding one of the video segments, a start time, a stop time, and an application program interface (API) intent for the corresponding video segment;
disambiguating between the first actions and the second actions where their associated video segments overlap in time within the output video content object, according to a hierarchy specifying which of the first and second actions take priority in the event of a conflict, and
producing control information for the output content object or group of content objects, wherein the control information specifies actions controlling playback of the content object or group of content objects for all video segments of the output video content object.

12. The method for control of video playback with the plurality of control files from the plurality of sources as recited in claim 11, further comprising receiving a control profile for the requested video content object or a group of video content objects, that provides the hierarchy specifying which of the first and second actions take priority in the event of a conflict among the control files.

13. The method for control of video playback with the plurality of control files from the plurality of sources as recited in claim 11, further comprising sending the control information to the video player of the end user system that renders the content object or group of content objects.

14. The method for control of video playback with the plurality of control files from the plurality of sources as recited in claim 11, wherein the control information specifies the content object or group of content objects.

15. The method for control of video playback with the plurality of control files from the plurality of sources as recited in claim 11, wherein the control information is encapsulated in a file that is requested by the end user system that renders the content object or group of content objects.

16. The method for control of video playback with the plurality of control files from the plurality of sources as recited in claim 11, wherein an action specified in the control information allows or prohibits functionality during playback of the content object or group of content objects.

17. The method for control of video playback with the plurality of control files from the plurality of sources as recited in claim 11, wherein an action specified in the control information causes a visible control to appear during a time window of playback of the content object or group of content objects.

18. One or more non-transitory machine-readable media having machine-executable instructions configured to perform the machine-implementable method for control of video playback with the plurality of control files from the plurality of sources of claim 11.

19. A machine adapted to perform the machine-implementable method for control of video playback with the plurality of control files from the plurality of sources of claim 11.

* * * * *